United States Patent
Schuessler et al.

(10) Patent No.: US 8,686,842 B2
(45) Date of Patent: Apr. 1, 2014

(54) DOOR LOCKING SYSTEM FOR A MOTOR VEHICLE

(75) Inventors: Peter Eduard Schuessler, Hoesbach (DE); Andreas Heberer, Mainz (DE); Mario Tassotto, Darmstadt (DE); Oliver Roettel, Buettelborn (DE); Joachim Schuberth, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 13/100,815

(22) Filed: May 4, 2011

(65) Prior Publication Data

US 2011/0285522 A1    Nov. 24, 2011

(30) Foreign Application Priority Data

May 19, 2010   (DE) ................. 20 2010 006 995 U

(51) Int. Cl.
*B60R 25/10*     (2013.01)

(52) U.S. Cl.
USPC ............ 340/426.22; 340/426.15; 340/426.24; 340/426.28; 180/289; 180/286; 180/271

(58) Field of Classification Search
USPC ............ 340/426.22, 426.15, 426.24, 426.28; 180/289, 286, 271
See application file for complete search history.

(56) References Cited

U.S. PATENT DOCUMENTS

| | | | | |
|---|---|---|---|---|
| 3,869,158 A | * | 3/1975 | Ciciulla ..................... | 292/35 |
| 5,547,208 A | * | 8/1996 | Chappell et al. ............ | 180/281 |
| 5,656,990 A | * | 8/1997 | Schwimmer .............. | 340/426.28 |
| 5,865,480 A | * | 2/1999 | Bain et al. ................. | 292/67 |
| 5,898,365 A | | 4/1999 | Niederlein | |
| 6,055,478 A | * | 4/2000 | Heron ........................ | 701/486 |
| 6,516,607 B1 | | 2/2003 | Brueck et al. | |
| 7,075,416 B2 | * | 7/2006 | Johnson et al. .......... | 340/426.28 |

(Continued)

FOREIGN PATENT DOCUMENTS

| | | |
|---|---|---|
| DE | 3721572 A1 | 2/1988 |
| GB | 2173542 A | 10/1986 |
| GB | 2329928 A | 4/1999 |
| GB | 2457580 A | 8/2009 |

OTHER PUBLICATIONS

British Patent Office, British Search Report for Application No. 1104500.2, dated Jul. 18, 2011.

(Continued)

*Primary Examiner* — George Bugg
*Assistant Examiner* — Naomi Small
(74) *Attorney, Agent, or Firm* — Ingrassia Fisher & Lorenz, P.C.

(57) ABSTRACT

A door locking system is provided for a motor vehicle. The door locking system includes, but is not limited to a mechanical door opening safety catch and a warning unit configured to generate a first warning signal that is exclusively suppressed by a manual activation of the mechanical door opening safety catch. A motor vehicle is provided that includes, but is not limited to a vehicle body, a rear vehicle door that is linked on the vehicle body and facing away from a vehicle travel direction, the rear vehicle door configured to pivot, a door opening safety catch configured to be mechanically activate upon the pivot of the rear vehicle door, and a warning unit configured to generate a first warning signal that is exclusively suppressed by the mechanical activation of the door opening safety catch.

20 Claims, 2 Drawing Sheets

(56) References Cited

U.S. PATENT DOCUMENTS

| | | | |
|---|---|---|---|
| 8,035,504 B2* | 10/2011 | White | 340/457.1 |
| 2002/0149207 A1 | 10/2002 | Bromhall | |
| 2003/0128148 A1* | 7/2003 | Park et al. | 342/20 |
| 2004/0098968 A1 | 5/2004 | van Nieuwstadt et al. | |
| 2005/0093305 A1* | 5/2005 | Jackson | 292/216 |
| 2006/0241836 A1* | 10/2006 | Kachouh et al. | 701/49 |
| 2008/0202104 A1 | 8/2008 | Ichikawa | |
| 2009/0293459 A1 | 12/2009 | Shimomura et al. | |

OTHER PUBLICATIONS

British Patent Office, British Search Report for British Application No. 1008343.4, dated Aug. 27, 2010.

* cited by examiner

DOOR LOCKING SYSTEM FOR A MOTOR VEHICLE

CROSS-REFERENCE TO RELATED APPLICATION

This application claims priority to German Patent Application No. 202010006995.5, filed May 19, 2010, which is incorporated herein by reference in its entirety.

TECHNICAL FIELD

The technical field relates to a door locking system and a method for locking, in particular for emergency locking of motor vehicle doors, especially doors which are situated in the rear of the motor vehicle.

BACKGROUND

Motor vehicles, in particular passenger automobiles, typically have a central locking system, via which all vehicle doors are coupled to one another for simultaneous closing and opening. Sometimes, door locking systems for motor vehicles have automatic locking, which independently locks all vehicle doors of the vehicle as a function of the vehicle velocity, for example, typically above approximately 4 km/h. An open, or incorrectly closed or locked motor vehicle door is typically indicated to the driver of the vehicle in the dashboard via the onboard electronics. Displays of this type typically also provide an indication of which of the vehicle doors coming into consideration is incorrectly closed.

A system of this type is known, for example, from DE 10 2007 041 701 A1. This motor vehicle is equipped with central locking and with a display screen in the vehicle interior, the locking state of the central locking being able to be displayed using the display screen. Furthermore, a warning message can be output via the display screen, for example, if a door or hatch is not correctly locked or a window is not completely closed or another malfunction or a defect of the motor vehicle has occurred.

For motor vehicles, in the case of which rear doors are attached at the rear, therefore on the C column, it is further required that the rear doors may not be opened when the motor vehicle is in motion. Otherwise, a door which is only slightly open would be engaged by the travel wind and flung into its maximum open position. Therefore, special requirements are to be placed on the security of the closing and locking systems of such rear doors which are attached to the rear in the travel direction. Although known door locking systems function extremely safely and reliably, sufficient safety of the occupants is to be ensured for the rare case of a malfunction or a system failure of the locking system or the vehicle electronics.

In view of the foregoing, at least one object is to provide a door locking system having a failsafe or a redundant or additional opening safety catch, in particular for the rear doors of the motor vehicle. The door locking system, which is to be implemented as error-redundant, is to be able to be implemented with the least possible effort and costs. In addition, other objects, desirable features and characteristics will become apparent from the subsequent summary and detailed description, and the appended claims, taken in conjunction with the accompanying drawings and this background.

SUMMARY

The door locking system provided according to an embodiment is provided for a motor vehicle, in particular for a passenger automobile. It has a warning unit, which is implemented for generating a first warning signal as a result of a detection of a malfunction of the vehicle locking. The warning signal is only to be generated in this case if an error or a malfunction is detected in the predominantly electrically activated closing and locking system. For example, if those sensors assigned to the locking system, which are to detect the open or closed state of the particular vehicle door, do not function properly and transmit corresponding error signals to a control unit of the vehicle or the locking system.

The warning signal is to be generated at least if it can no longer be established with sufficient reliability whether the door locking system operates safely and reliably. The warning signal is to be implemented with respect to intensity and configuration in such a manner that it indicates the potential safety risks which could originate from the locking system particularly urgently to the driver of the motor vehicle. The warning signal is preferably penetrating and unpleasant enough that it keeps the driver from driving further. As a result, the driver will attempt to suppress the warning signal. The door locking system has a mechanism for this purpose, which is implemented to suppress the first warning signal, but makes this a function of the condition that at least one door opening safety catch of at least one motor vehicle door is manually activated.

The warning unit of the door locking system is therefore implemented for the purpose of announcing a malfunction or disturbance of the locking system by generating the first warning signal, which is to cause the vehicle occupants to manually activate a door opening safety catch. The warning unit is further implemented in this case for the purpose of suppressing the actual warning signal to be generated and/or deactivating its generation as a result of manual activation of a mechanical door opening safety catch. For this purpose, the door locking system preferably has a separate sensor system for ascertaining the status of the door opening safety catch. The sensor system or the control mechanism assigned thereto is to be implemented as independent and autonomous of the actual door locking system and/or independent of the vehicle onboard electronics for this purpose, so that in particular in the event of a malfunction of the door locking system, this redundantly provided warning mechanism can still function error-free.

According to another embodiment, it is provided that the first warning signal is implemented as an acoustically perceptible signal. The warning signal therefore preferably comprises a warning tone, which can sound as a periodically repeating warning tone and/or also as a continuous tone according to a further embodiment. It can also be provided for this purpose that a continuous tone to be generated immediately upon detection of the malfunction merges after a predetermined time into a signal which only repeats periodically.

According to a further embodiment, it is provided that the warning unit is further implemented to generate a second visually perceptible warning signal. The second warning signal can contain information about the type of the occurring malfunction, for example. For example, it can indicate that a malfunction is present in the door locking system. Furthermore, in certain circumstances, the second warning signal can specify in greater detail where and what precisely the detected malfunction consists of.

According to a further embodiment, it is further provided that the second warning signal is visually displayed in the dashboard of the motor vehicle.

In the case of a further embodiment, it is further provided that even after suppression of the first warning signal, the second warning signal remains activated, which preferably continuously signals to the driver that the door locking system is to be checked and possibly subjected to a repair in a workshop.

According to another embodiment, it is further provided that the door opening safety catch is implemented as a child safety catch, and all child safety catches of the motor vehicle are to be activated to suppress the first warning signal. A child safety catch which is provided in the rear doors of the motor vehicle anyway preferably functions as a door opening safety catch, which prevents opening of the particular vehicle door from the inside. Depending on the precision of the error acquisition, for example, if the warning unit is to be capable of specifying more precisely the door at which a malfunction has occurred, it can also be sufficient for the suppression of the first warning signal if only the door opening safety catch assigned to the affected door is activated.

According to a further embodiment, it is further provided that the vehicle doors equipped with a mechanical door opening safety catch have a display unit, which indicates an inactive door opening safety catch with generation of the first warning signal. This display unit is particularly attached on the interior and visibly on the motor vehicle interior trim. It can be implemented as a lighted or blinking LED, for example. In this manner, it is immediately and directly indicated to the driver of the vehicle upon occurrence of a system error which of the rear doors can currently still be opened from the inside and requires activation of its door opening safety catch or child safety catch.

According to another embodiment, it is further provided in this case that this door-specific display unit visually indicates the status of the door opening safety catch, and extinguishes this signal with activation of the mechanical door opening safety catch According to a further embodiment, a method is provided for activating a door opening safety catch, comprising the steps of generating a first warning signal as a result of the detection of a malfunction of a motor vehicle door lock and manual activation of all mechanical door opening safety catches provided in the motor vehicle—if these are not yet to be activated—to suppress the first warning signal In addition thereto, it is provided that a second, preferably visually perceptible warning signal is generated with the first warning signal, which indicates that a malfunction of the door locking system exists. However, the second warning signal remains permanently activated with suppression of the first warning signal as a result of the activation of the door opening safety catch, until the disturbance in the door locking system is professionally remedied.

According to another embodiment, it is further provided in this case that an inactive door opening safety catch is visually indicated on the vehicle doors equipped with a mechanical door opening safety catch with generation of the first warning signal.

In a further embodiment, a motor vehicle is provided having an above-described door locking system. In a preferred embodiment, the motor vehicle has rear doors for this purpose which, viewed in the travel direction, are attached at the rear on the motor vehicle body and have a closing and locking mechanism which cooperates with the B column of the motor vehicle. The doors are linked on the vehicle body so they are pivotable in this case and are to be opened by a pivot movement to the rear directed opposite to the travel direction of the vehicle.

Although the locking system according to the embodiments is preferably used for rear doors of passenger automobiles which are linked so they are pivotable on the C column of the vehicle body, the use of the locking system is not solely restricted to those door configurations, but rather can be used universally in all motor vehicles having greatly varying vehicle doors.

BRIEF DESCRIPTION OF THE FIGURES

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 2:
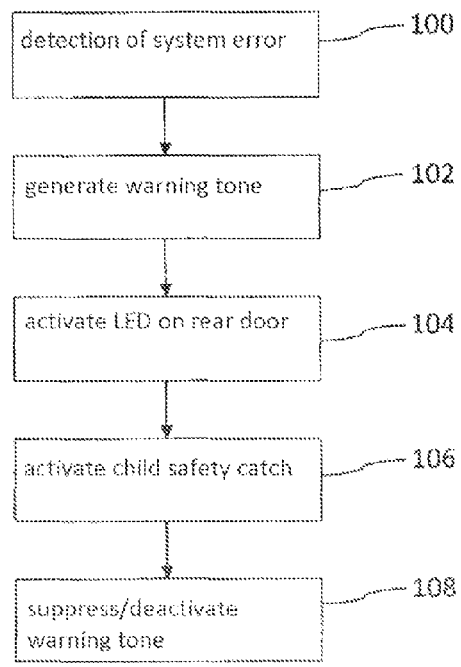
FIG. 2 shows a flowchart for the activation of the door opening safety catch.

The sequence of a typical method for activating the door opening safety catch or child safety catch is schematically illustrated in FIG. 2. In first step 100, as soon as the vehicle electronics detect a malfunction of the door locking system or for the case in which the door locking system sends an error code to the onboard electronics, a warning tone is generated by a control unit in following step 102. Optionally, display units provided on the rear doors of the motor vehicle, such as LEDs, which signal the prevailing state of a child safety catch of the particular vehicle door, may be activated separately with generation of this warning tone.

An activation of an LED provided on the door internal trim, for example, is performed in step 104. The generation of the warning tone 102 and the activation of a signal which further specifies the error in step 104 can be performed in sequence and also essentially simultaneously. The warning tone is preferably sufficiently unpleasant to the driver of the vehicle that he refrains from continuing driving and deals as soon as possible with the suppression of the warning tone. For this purpose, a mechanical opening safety catch, in particular a mechanical child safety catch, which is provided at least on the rear doors must be manually activated 106. The required activation is detected in this case by a separate sensor system, which transmits a corresponding acknowledgment to the warning unit, as a result of which at least the warning tone is suppressed or deactivated in step 108 and the driver can continue driving extensively without impairment.

By engaging the child safety catch in step 106 it is ensured in any case that the rear doors may not be opened from the inside, so that opening of the door during travel, which is sometimes hazardous to the occupants, can be prevented. The generation of the warning tone can also be accompanied by generation of a visual warning signal, which is preferably indicated to the driver in the dashboard. This second warning signal symbolizes, for example, that a malfunction exists in the door locking system. The second warning signal remains active after suppression of the first warning signal implemented as a warning tone, however, and continuously reminds the driver of the vehicle that a professional workshop is absolutely to be sought out to remedy the malfunction of the locking system.

Figure 1:
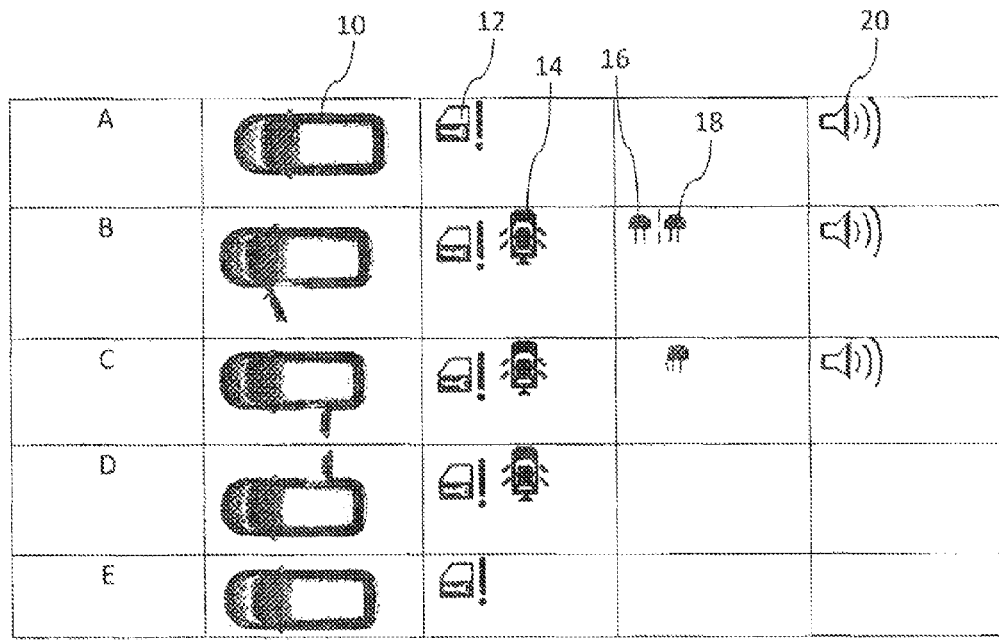
FIG. 1 shows five different states of the door locking system upon occurrence of a malfunction.

The tabular diagram according to FIG. 1 illustrates the typical sequence of a provided activation of the door opening safety catch on the basis of the states of individual units which generate warning signals. The five states A through E, which occur in chronological sequence, are listed in the first column. The second column illustrates the configuration of the vehicle doors, the warning signals and indicators 12, 14 specified in the dashboard are listed in column 3. The fourth column illustrates the display units 16, 18, which are provided on the rear doors and are preferably implemented as LEDs. Finally, the fifth column symbolizes the acoustically perceptible first warning signal 20.

As soon as a malfunction of the door locking system of a motor vehicle is detected, the warning unit activates a second warning signal 12 and also a first warning signal 20. While the second warning signal 12 is preferably represented in the dashboard in the form of a door symbol together with a warning notice, the first warning signal 12 is implemented as a continuous tone or as a repeating signal noise. The first warning signal 20 causes the driver to interrupt the travel immediately, to bring the vehicle to a standstill, and possibly to turn off the engine and the ignition.

In following step "B", which is shown in the second line of the diagram according to FIG. 1, the driver of the car opens the driver door provided on the front left. As a result, the door symbol 14 in the dashboard lights up. In addition, individual LEDs 16, 18 on the rear doors are activated at latest in step "B", which are to indicate a currently inactive child safety catch. The warning tone 20 still sounds in this case.

In a further embodiment, the LEDs may also be implemented independently and decoupled from the warning unit 32, in that they only indicate an unlocked door and thus signal to the vehicle occupants, for example, that the door can be manually opened, for example, because of a vehicle velocity below a predefined limiting velocity of 4 km/h, for example.

In following step "C", the vehicle occupant or the driver opens one of the rear doors and manually activates the mechanical child safety catch, as a result of which the LED 16 assigned to the rear left door is extinguished. In the present example, however, the child safety catch of the right door is still to be activated, because of which the warning tone 20 still sounds in step "C".

In following step "D", which corresponds to step 106 according to FIG. 2, the further child safety catch provided on the right rear door is also activated. As a result thereof, the LED 18 assigned to the right rear door and also the warning tone 20 are extinguished.

In step "E", the travel of the vehicle can now be continued, however, the second warning signal 12 remaining continuously activated and signaling to the driver that a malfunction exists in the door locking system. In any case, through the generation of a separate warning tone 20, the activation of the child safety catch and a corresponding intervention of the driver of the vehicle would be caused, so that opening of the rear doors from the interior can be prevented for safety reasons for the travel, which is now to be continued.

Figure 3:
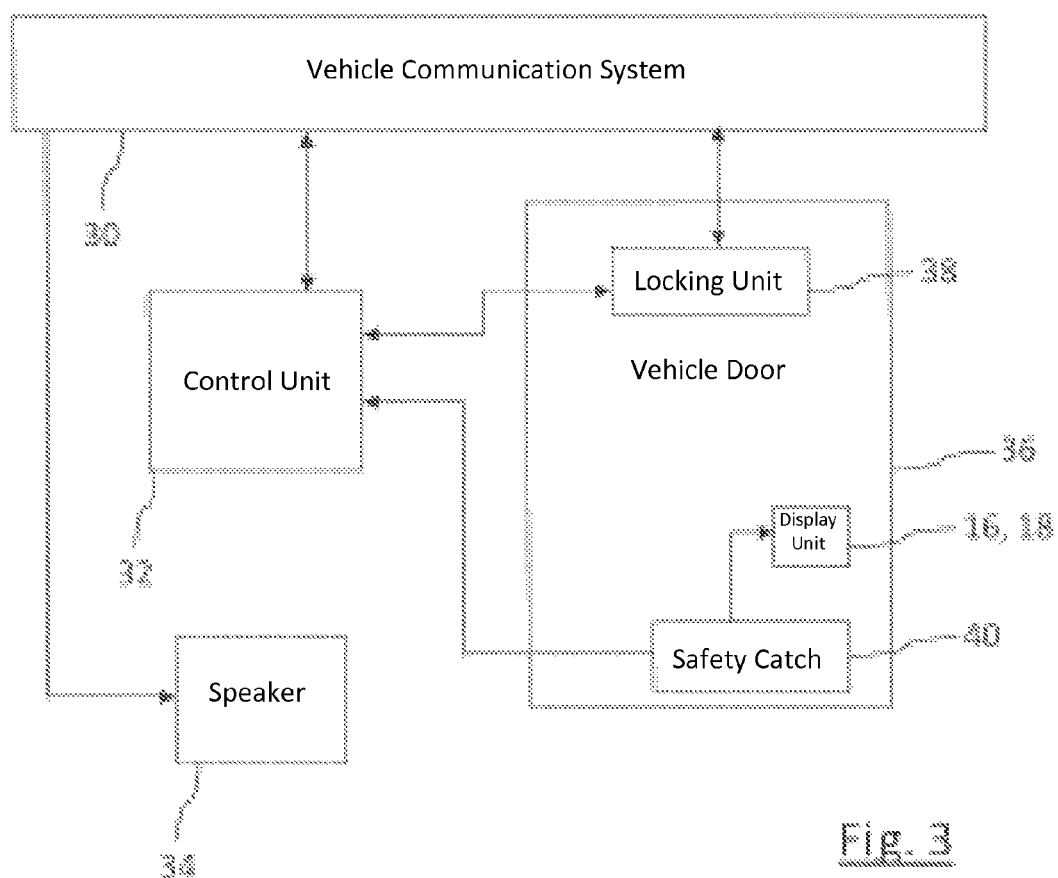
FIG. 3 shows a block diagram which illustrates the components of the door locking system and their interaction with one another.

A possible implementation of the door locking system is schematically shown in FIG. 3. The door locking system has a control unit 32, which is electrically coupled to an internal vehicle communication system 30, such as a CAN bus or a similar onboard electrical system. The control unit 30 can electrically activate and deactivate a locking unit 38 provided in the vehicle door 36 in a direct manner. Additionally or alternatively thereto, it is conceivable that the activation of the locking unit 38 is performed by the control unit 32 indirectly via the onboard electrical system 30.

However, if the control unit 32 establishes a system failure or an error code is transmitted thereto which indicates a disturbance of the door locking system, the control unit 32 functions as a warning unit and activates the generation of the warning tone via a loudspeaker 34 which is situated in the vehicle interior. The generation of the warning tone is triggered by the control unit 32. The activation of the loudspeaker 34 is performed in this case via the onboard electrical system 30, however, to which the loudspeaker, having an upstream communication module, such as a car radio, is connected. As an alteration thereof, it would further be conceivable to couple the communication module or its loudspeaker directly to the control unit 32.

Independently and autonomously of the remaining vehicle electronics 30, the vehicle door 36 has a mechanical door opening safety catch 40, for example, in the form of a child safety catch, whose state is relayed to the control unit 32 using suitable electrical and/or mechanical sensors, for example. As soon as all child safety catches 40 of the vehicle doors 36 are activated and in this manner the rear doors of the motor vehicle are locked, the signal tone is suppressed or deactivated.

Furthermore, to identify the state of the door opening safety catch, a display unit 16, 18, for example, in the form of an LED, is provided locally on each vehicle door, which indicates the unlocked or locked state of the particular motor vehicle door to the vehicle occupants, for example, in normal and trouble-free vehicle operation. For the emergency locking system according to the invention, deviating there from, this LED 16, 18 can function for indicating an active or inactive child safety catch.

No or only slight constructive adaptations of the door locking are required for the implementation of the door locking system. The generation of the first warning signal, which characterizes a potential safety-hazard malfunction of the door locking system, can be implemented in particular solely with software support.

The illustrated embodiment solely shows possible designs of the invention, for which numerous further variants are conceivable and in the scope of the invention. The exemplary embodiments shown for exemplary purposes are in no way to be understood as restrictive with respect to the scope, the applicability, or the configuration possibilities of the invention. The present description only indicates a possible implementation of an exemplary embodiment according to the invention to a person skilled in the art. Thus, greatly manifold modifications may be performed on the function and configuration of described elements, without leaving the protective scope defined by the following claims or its equivalents in this case. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:
1. A door locking system for a motor vehicle, comprising:
   a control unit configured to control a plurality of locking units;
   a mechanical door opening safety catch independent of the control unit; and a warning unit communicatively coupled to the control unit, wherein, when the control unit determines an error is occurring with the door locking system, the control unit is configured to activate the warning unit to generate a first warning signal that is exclusively suppressed by a manual activation of the mechanical door opening safety catch.

2. The door locking system according to claim 1, wherein the first warning signal is an acoustic signal.

3. The door locking system according to claim 1, wherein the first warning signal is a periodically repeating signal.

4. The door locking system according to claim 1, wherein the first warning signal is a substantially continuous signal.

5. The door locking system according to claim 1, wherein the warning unit is configured to generate a second warning signal.

6. The door locking system according to claim 5, wherein the second warning signal is a visually perceptible warning signal.

7. The door locking system according to claim 5, wherein the second warning signal remains activate after suppression of the first warning signal.

8. The door locking system according to claim 5, wherein the second warning signal remains activate after deactivation of the first warning signal.

9. The door locking system according to claim 5, wherein the second warning signal is produced from a dashboard of the motor vehicle.

10. The door locking system according to claim 1, wherein the mechanical door opening safety catch is a child safety catch.

11. The door locking system according to claim 1, wherein a door of the motor vehicle is equipped with the mechanical door opening safety catch comprising a visually perceptible display unit that is configured to indicate an inactive door opening safety catch, and the warning unit is further configured to activate the visually perceptible display unit substantially with a generation of the first warning signal.

12. The door locking system according to claim 1, wherein a door of the motor vehicle is equipped with the mechanical door opening safety catch comprising a visually perceptible display unit that is configured to indicate an inactive door opening safety catch, and the warning unit is further configured to activate the visually perceptible display unit after a generation of the first warning signal.

13. The door locking system according to claim 11, wherein a visual signal of the visually perceptible display unit, which is specific to the door, is extinguished with activation of the mechanical door opening safety catch assigned to the door.

14. A motor vehicle, comprising:
a vehicle body;
a rear vehicle door that is linked on the vehicle body and facing away from a vehicle travel direction, the rear vehicle door configured to pivot;
a door locking system comprising a locking unit on each door of the vehicle;
a control unit configured to control the door locking system;
a door opening safety catch independent of the door locking system and the control unit, the door opening safety catch configured to be-mechanically activate upon the pivot of the rear vehicle door; and
a warning unit communicatively coupled to the control unit,
wherein, when the control unit determines an error is occurring with the door locking system, the control unit is configured to activate the warning unit to generate a first warning signal that is exclusively suppressed by a mechanical activation of the door opening safety catch.

15. The motor vehicle according to claim 14, wherein the first warning signal is an acoustic signal.

16. The motor vehicle according to claim 14, wherein the first warning signal is a periodically repeating signal.

17. The motor vehicle according to claim 14, wherein the first warning signal is a substantially continuous signal.

18. The motor vehicle according to claim 14, wherein the warning unit is configured to generate a second warning signal.

19. The motor vehicle according to claim 18, wherein the second warning signal is a visually perceptible warning signal.

20. The motor vehicle according to claim 18, wherein the second warning signal remains activate after suppression of the first warning signal.

* * * * *